United States Patent
Shimpi et al.

(10) Patent No.: US 11,680,547 B2
(45) Date of Patent: *Jun. 20, 2023

(54) ELECTRONIC FILTER DETECTION FEATURE FOR LIQUID FILTRATION SYSTEMS

(71) Applicant: Cummins Filtration IP, Inc., Columbus, IN (US)

(72) Inventors: Abhijit Shimpi, Nashville, TN (US); Joseph Okoro, Columbus, IN (US); Andry Lesmana, Columbus, IN (US); Abhijeet Vaidya, Columbus, IN (US); Adaeze Okoye, Indianapolis, IN (US); John T. Carroll, III, Columbus, IN (US); Matthew L. Schneider, Seymour, IN (US); Barry M. Verdegan, Stoughton, WI (US); Chad M. Thomas, Cookeville, TN (US)

(73) Assignee: CUMMINS FILTRATION IP, INC., Columbus, IN (US)

( * ) Notice: Subject to any disclaimer, the term of this patent is extended or adjusted under 35 U.S.C. 154(b) by 175 days.

This patent is subject to a terminal disclaimer.

(21) Appl. No.: 17/202,835

(22) Filed: Mar. 16, 2021

(65) Prior Publication Data

US 2021/0199079 A1 Jul. 1, 2021

Related U.S. Application Data

(63) Continuation of application No. 16/220,481, filed on Dec. 14, 2018, now Pat. No. 11,015,556, which is a
(Continued)

(51) Int. Cl.
*F02M 37/28* (2019.01)
*B01D 35/143* (2006.01)
(Continued)

(52) U.S. Cl.
CPC ............. *F02M 37/28* (2019.01); *B01D 17/12* (2013.01); *B01D 35/005* (2013.01);
(Continued)

(58) Field of Classification Search
CPC .. B01D 35/005; B01D 35/143; B01D 37/025; B01D 46/429; F01M 13/04; F02D 41/22; F02D 41/26; F02M 35/024; H04B 7/24
(Continued)

(56) References Cited

U.S. PATENT DOCUMENTS

| | | |
|---|---|---|
| 5,070,832 A | 12/1991 | Hapka et al. |
| 5,193,513 A | 3/1993 | Marko et al. |

(Continued)

FOREIGN PATENT DOCUMENTS

| | | | | |
|---|---|---|---|---|
| CA | 2492914 C | * | 12/2009 | ............... F02C 9/263 |
| CA | 2773651 A1 | * | 6/2012 | ......... F02D 19/0605 |

(Continued)

OTHER PUBLICATIONS

Bo-Chiuan et al., "Estimation of Engine Rotational Dynamics Using Kalman Filter Based on a Kinematic Model," 2010, vol. 59, Publisher: IEEE.
(Continued)

*Primary Examiner* — Tuan C To
(74) *Attorney, Agent, or Firm* — Foley & Lardner LLP

(57) ABSTRACT

A filter monitor system ("FMS") module is installed on the engine/vehicle and is connected to the filter systems, sensors and devices to monitor various performance parameters. The module also connects to the engine control module ("ECM") and draws parameters from the ECM. The FMS module is capable of interfacing with various output devices such as a smartphone application, a display monitor, an OEM telematics system or a service technician's tool on a computer. The FMS module consists of hardware and software algo- (Continued)

rithms which constantly monitor filter systems and provide information to the end-user. FMS module provides necessary inputs and outputs for electronic sensors and devices.

26 Claims, 13 Drawing Sheets

Related U.S. Application Data continuation of application No. 15/029,442, filed as application No. PCT/US2014/060888 on Oct. 16, 2014, now Pat. No. 10,184,415.

(60) Provisional application No. 61/891,593, filed on Oct. 16, 2013.

(51) Int. Cl.
| | |
|---|---|
| *B01D 37/02* | (2006.01) |
| *F02M 37/40* | (2019.01) |
| *B01D 17/12* | (2006.01) |
| *B01D 35/00* | (2006.01) |
| *B01D 37/00* | (2006.01) |
| *B01D 46/42* | (2006.01) |
| *F01M 13/04* | (2006.01) |
| *F01P 11/06* | (2006.01) |
| *F02D 41/22* | (2006.01) |
| *F02D 41/26* | (2006.01) |
| *F02M 35/024* | (2006.01) |
| *H04B 7/24* | (2006.01) |

(52) U.S. Cl.
CPC ......... *B01D 35/143* (2013.01); *B01D 37/00* (2013.01); *B01D 37/02* (2013.01); *B01D 37/025* (2013.01); *B01D 46/429* (2013.01); *F01M 13/04* (2013.01); *F01P 11/06* (2013.01); *F02D 41/22* (2013.01); *F02D 41/26* (2013.01); *F02M 35/024* (2013.01); *F02M 37/40* (2019.01); *B01D 2201/54* (2013.01); *B01D 2201/56* (2013.01); *F01M 2013/0438* (2013.01); *H04B 7/24* (2013.01)

(58) Field of Classification Search
USPC .......................................................... 701/34
See application file for complete search history.

(56) References Cited

U.S. PATENT DOCUMENTS

| | | | |
|---|---|---|---|
| 5,501,198 A | 3/1996 | Koyama | |
| 5,611,923 A | 3/1997 | Suri et al. | |
| 5,713,971 A | 2/1998 | Rohrbach et al. | |
| 6,207,045 B1 | 3/2001 | Jiang | |
| 6,533,926 B2 | 3/2003 | Hawkins et al. | |
| 6,537,444 B2 | 3/2003 | Wilberscheid et al. | |
| 6,711,524 B2 | 3/2004 | Wolf et al. | |
| 6,732,507 B1 | 5/2004 | Stanglmaier et al. | |
| 6,822,582 B2 | 11/2004 | Voeller et al. | |
| 6,894,489 B2 | 5/2005 | Makuuchi et al. | |
| 6,982,653 B2 | 1/2006 | Voeller et al. | |
| 7,042,346 B2 | 5/2006 | Paulsen | |
| 7,168,304 B2 * | 1/2007 | Beaucaire | G01M 3/3227 73/114.38 |
| 7,173,515 B2 | 2/2007 | Ohki et al. | |
| 7,177,553 B2 | 2/2007 | Ono | |
| 7,258,718 B2 | 8/2007 | Dworatzek et al. | |
| 7,400,268 B2 | 7/2008 | Wilbrink et al. | |
| 7,610,753 B2 * | 11/2009 | Kitahara | F01N 3/0842 60/276 |
| 7,692,544 B2 | 4/2010 | Hiraiwa et al. | |
| 7,737,847 B2 | 6/2010 | Malone et al. | |
| 8,050,874 B2 | 11/2011 | Papadimitriou et al. | |
| 8,057,669 B2 | 11/2011 | Beard et al. | |
| 8,105,485 B2 * | 1/2012 | Kolczyk | B01D 27/101 210/429 |
| 8,209,076 B2 | 6/2012 | Boss et al. | |
| 8,409,446 B2 * | 4/2013 | Abdalla | F02M 37/34 210/114 |
| 8,673,137 B2 | 3/2014 | Verdegan et al. | |
| 8,810,364 B2 | 8/2014 | Komine et al. | |
| 8,830,031 B2 | 9/2014 | Komine et al. | |
| 9,212,627 B2 | 12/2015 | Fulton et al. | |
| 9,279,780 B2 | 3/2016 | Gwin et al. | |
| 9,345,637 B2 | 5/2016 | Larson et al. | |
| 9,399,857 B2 | 7/2016 | Kawasaki et al. | |
| 9,496,720 B2 | 11/2016 | McShane et al. | |
| 9,581,101 B2 * | 2/2017 | Huber | F02D 41/30 |
| 10,025,960 B1 | 7/2018 | Fink et al. | |
| 10,184,415 B2 * | 1/2019 | Shimpi | B01D 37/02 |
| 10,286,343 B2 | 5/2019 | Paluszewski et al. | |
| 10,596,985 B2 | 3/2020 | Franz | |
| 2001/0042372 A1 * | 11/2001 | Khair | F02M 26/35 60/275 |
| 2006/0207948 A1 | 9/2006 | Hacker et al. | |
| 2006/0272303 A1 | 12/2006 | Fujiwara et al. | |
| 2007/0061064 A1 | 3/2007 | Dollmeyer et al. | |
| 2007/0262003 A1 | 11/2007 | Kussel | |
| 2008/0074559 A1 | 3/2008 | Choi | |
| 2008/0079545 A1 | 4/2008 | McLaren | |
| 2008/0104948 A1 * | 5/2008 | Kapparos | F01N 9/002 60/297 |
| 2008/0190099 A1 * | 8/2008 | Yezerets | F01N 3/0842 60/299 |
| 2008/0224838 A1 | 9/2008 | Rains et al. | |
| 2009/0273230 A1 | 11/2009 | Wang et al. | |
| 2009/0288399 A1 | 11/2009 | Fayard | |
| 2010/0101409 A1 | 4/2010 | Bromberg et al. | |
| 2010/0117796 A1 | 5/2010 | Claessen | |
| 2010/0281852 A1 | 11/2010 | Conrad | |
| 2011/0036070 A1 | 2/2011 | Schrewe et al. | |
| 2011/0062060 A1 | 3/2011 | Royal et al. | |
| 2011/0148584 A1 | 6/2011 | Lee et al. | |
| 2011/0153144 A1 | 6/2011 | Dlugoss et al. | |
| 2011/0168613 A1 | 7/2011 | Van Savooijen et al. | |
| 2011/0209460 A1 | 9/2011 | He et al. | |
| 2011/0220560 A1 | 9/2011 | Verdegan et al. | |
| 2011/0259802 A1 | 10/2011 | Wieczorek et al. | |
| 2012/0031979 A1 | 2/2012 | Kang | |
| 2012/0083990 A1 * | 4/2012 | Nevin | F02D 41/029 703/2 |
| 2012/0158242 A1 * | 6/2012 | Snopko | F01N 9/002 60/277 |
| 2012/0179136 A1 * | 7/2012 | Rinehart | A61B 5/029 604/503 |
| 2012/0253595 A1 | 10/2012 | Oakes | |
| 2013/0006465 A1 | 1/2013 | Boss et al. | |
| 2013/0006548 A1 | 1/2013 | Zanetti et al. | |
| 2013/0008308 A1 * | 1/2013 | Govindappa | F02M 35/0215 96/426 |
| 2013/0028362 A1 | 1/2013 | Rofougaran et al. | |
| 2013/0036804 A1 | 2/2013 | Uehara | |
| 2013/0173106 A1 * | 7/2013 | Konishi | B60W 20/11 701/123 |
| 2013/0199983 A1 | 8/2013 | Patel et al. | |
| 2013/0201006 A1 | 8/2013 | Kummetz et al. | |
| 2013/0220900 A1 | 8/2013 | Milvert et al. | |
| 2013/0255485 A1 * | 10/2013 | Appelo | B01D 46/04 95/20 |
| 2013/0299398 A1 | 11/2013 | Wildermuth et al. | |
| 2013/0327696 A1 | 12/2013 | Bagci et al. | |
| 2013/0330205 A1 | 12/2013 | Apostolides et al. | |
| 2014/0123627 A1 | 5/2014 | Larose et al. | |
| 2014/0161671 A1 | 6/2014 | Cuellar et al. | |
| 2015/0019108 A1 * | 1/2015 | Hendrickson | G01F 23/296 701/102 |
| 2015/0064962 A1 | 3/2015 | Baer et al. | |
| 2015/0240459 A1 | 8/2015 | Kawasaki et al. | |
| 2016/0067639 A1 | 3/2016 | Shimpi et al. | |
| 2016/0116392 A1 | 4/2016 | Carpenter et al. | |
| 2017/0080363 A1 | 3/2017 | Krause et al. | |

(56) References Cited

U.S. PATENT DOCUMENTS

| | | |
|---|---|---|
| 2018/0144559 A1 | 5/2018 | Hukill et al. |
| 2020/0009485 A1 | 1/2020 | Okoro et al. |
| 2020/0171421 A1 | 6/2020 | Amirnasr et al. |
| 2020/0380797 A1 | 12/2020 | Hukill et al. |

FOREIGN PATENT DOCUMENTS

| | | | |
|---|---|---|---|
| CN | 101218418 A | 7/2008 | |
| CN | 101432741 A | 5/2009 | |
| CN | 202623952 U | 12/2012 | |
| CN | 202795413 U | 3/2013 | |
| CN | 103370505 A | 10/2013 | |
| DE | 103 233 96.1 A1 | 12/2003 | |
| DE | 10 2012 208 601 | 12/2012 | |
| DE | 10 2012 209 553 | 12/2012 | |
| DE | 11 2011 101 982 T5 | 6/2013 | |
| DE | 11 2014 000 544 T5 | 11/2015 | |
| EP | 0 698 408 | 2/1996 | |
| EP | 1 151 783 A2 | 11/2001 | |
| EP | 2 234 206 A1 | 9/2010 | |
| EP | 3 417 926 A1 | 12/2018 | |
| EP | 3 745 363 A1 | 12/2020 | |
| ES | 2283225 | 10/2007 | |
| WO | WO-96/16716 A1 | 6/1996 | |
| WO | WO-2005001265 A1 * | 1/2005 | ........... F02D 31/007 |
| WO | WO-2005/113112 A1 | 12/2005 | |
| WO | WO-2007/129252 A1 | 11/2007 | |
| WO | WO-2008/074559 A1 | 6/2008 | |
| WO | WO-2012/082268 | 6/2012 | |
| WO | WO-2013/082665 A1 | 6/2013 | |
| WO | WO-2014/077053 A1 | 5/2014 | |
| WO | WO-2020/163231 A1 | 8/2020 | |
| WO | WO-2020/247813 A1 | 12/2020 | |

OTHER PUBLICATIONS

Final Office Action for U.S. Appl. No. 15/029,442 dated Nov. 30, 2017, 17 pages.
Final Office Action on U.S. Appl. No. 16/045,893 dated Dec. 14, 2020.
First Examination Report for Indian Patent App. No. 201647013220 dated Apr. 22, 2020, 6 pages.
First Examination Report issued for Australian Patent Application No. AU 2016379168, dated Feb. 24, 2021, 5 pages.
First Office Action for Chinese Patent App. No. 201480054878.1 dated Dec. 9, 2016, 19 pages (with translation).
First Office Action issued for Chinese Patent Application No. 2016800745149, dated Jul. 13, 2020, 15 pages (with translation).
Harsha Surenahalli et al., "A Kalman Filter Estimator for a Diesel Oxidation Catalyst during Active Regeneration of a CPF," 2012, Publisher: IEEE.
International Search Report & Written Opinion for PCT/US2014/060888 dated Mar. 10, 2015, 10 pages.
International Search Report & Written Opinion for PCT/US2016/067247 dated May 5, 2017, 20 pages.
Non-Final Office Action on U.S. Appl. No. 16/045,893 dated Aug. 4, 2020.
Notice of Allowance on U.S. Appl. No. 14/977,858 dated Jun. 25, 2018.
Notice of Allowance on U.S. Appl. No. 14/977,858 dated Jul. 12, 2018.
Notice of Allowance on U.S. Appl. No. 15/029,442 dated Sep. 21, 2018.
Notice of Allowance on U.S. Appl. No. 16/220,481 dated Jan. 25, 2021.
Office Action for Brazilian Patent App. No. 112016008218.4 dated Dec. 10, 2019, 7 pages (with translation).
Office Action for U.S. Appl. No. 14/977,858 dated Dec. 7, 2017, 18 pages.
Office Action for U.S. Appl. No. 15/029,442 dated Apr. 5, 2018, 18 pages.
Office Action for U.S. Appl. No. 15/029,442 dated Jun. 30, 2017, 12 pages.
German Office Action issued for German Patent Application No. DE 112014004773.2 dated Feb. 22, 2022, 7 pages.
Non-Final Office Action issued for U.S. Appl. No. 16/045,893 dated Mar. 31, 2021, 16 pages.
D.J. Helfritch et al., "Improved air filtration and filter sterilization using DC electric fields and a one atmosphere uniform glow discharge plasma (OAUGDP)," 1989, Publisher: IEEE Abstract.
Han et al., "Study on the Air Filtration Performance of Nanofibrous Membranes Compared with Conventional Fibrous Filters," 2010, Publisher: IEEE.
Non-Final Office Action issued for U.S. Appl. No. 17/575,362, dated Dec. 22, 2022.

* cited by examiner

ELECTRONIC FILTER DETECTION FEATURE FOR LIQUID FILTRATION SYSTEMS

CROSS-REFERENCE TO RELATED APPLICATIONS

This application is a continuation of U.S. patent application Ser. No. 16/220,481, filed Dec. 14, 2018, which is a continuation of U.S. patent application Ser. No. 15/029,442, filed Apr. 14, 2016, now U.S. Pat. No. 10,184,415, which issued Jan. 22, 2019, which is a U.S. national stage application claiming the benefit of International Application No. PCT/US2014/060888, filed on Oct. 16, 2014, which claims priority to U.S. Provisional Patent Application No. 61/891,593, entitled "FILTER MONITORING SYSTEMS AND METHODS OF OPERATING FILTER MONITORING SYSTEMS," filed on Oct. 16, 2013, and by Shimpi et al. The entire contents of these applications are incorporated herein by reference in their entirety.

FIELD

The present disclosure relates generally to systems for and methods of monitoring filtration systems of internal combustion engines.

BACKGROUND

On and off-highway commercial vehicles and equipment having internal combustion engines have very high costs of engine and/or machine downtime. The internal combustion engines can have various filtration systems, including air filtration systems, fuel filtration systems, lubricant filtration systems, hydraulic fluid filtration systems, crankcase ventilation filtration systems, coolant filtration systems, and the like. Each filtration system typically includes a filter element that needs to be replaced after a designated amount of use (e.g., a designated amount of engine run time, a designated amount of miles driven, a filter capacity, etc.). Diagnosis of the condition of the engine filter elements will help make important decisions about servicing particular filter elements that are close to usable life or that have already exceeded usable life. Replacing the filter elements helps to prevent damage to the engine systems due to overloaded filters.

It is in the interest of fleet owners to synchronize service events of multiple filter elements to reduce vehicle and equipment downtime. Various filtration system monitoring systems are needed to monitor the various filter elements. Fleets managing multiple vehicles also need to monitor parts inventory (e.g., the number and type of replacement filter elements readily available to use for service). Remote filter monitoring can help making smarter inventory decisions. Current monitoring systems require additional pins available on the engine control module ("ECM"), which is expensive and difficult to implement.

The following U.S. Patent Applications and Patents are all incorporated herein by reference in entirety.

U.S. patent application Ser. No. 13/412,280, filed Mar. 5, 2012, published Oct. 4, 2012 as U.S. Patent Publication No. US 2012/0253595A1.

U.S. Provisional Patent Application Ser. No. 61/810,946, filed Apr. 11, 2013

U.S. Pat. No. 6,207,045, issued Mar. 27, 2001.

U.S. patent application Ser. No. 12/860,499, filed Aug. 20, 2010, now U.S. Pat. No. 8,409,446, issued Apr. 2, 2013.

U.S. patent application Ser. No. 13/827,992, filed Mar. 14, 2013.

U.S. Provisional Patent Application Ser. No. 61/586,603, filed Jun. 12, 2012.

U.S. Provisional Patent Application Ser. No. 61/595,326, filed Feb. 6, 2012.

U.S. Provisional Patent Application Ser. No. 61/640,420, filed Apr. 30, 2012.

U.S. patent application Ser. No. 13/864,694, filed Apr. 17, 2013.

U.S. Provisional Patent Application Ser. No. 61/658,603, filed Jun. 12, 2012.

SUMMARY

Electronic systems for monitoring and controlling internal combustion engine filtration systems are disclosed. A micro-controller processing unit reads inputs from various electronic sensors and devices associated with various filtration systems of the internal combustion engine, and engine parameters from the ECM to make critical decisions like monitoring filter element (e.g., a cartridge element, a spin-on filter, etc.) condition, predicting remaining filter element service, calculating effect on engine performance, and providing service and diagnostic indications. The micro-controller processing unit is capable of monitoring multiple filtration systems associated with the internal combustion engine (e.g., fuel filtration systems, hydraulic fluid filtration systems, air filtration systems, lubricant filtration systems. etc) at the same time. The monitored filtration systems may be mounted inside or outside of the engine compartment. The micro-controller processing unit provides service indications relating to given filtration systems based on installed sensors (e.g., pressure drop sensors, mass air flow ("MAF") sensors, virtual sensors, etc.) and/or service indicating algorithms (e.g., algorithms that calculate a total amount of fluid volume filtered). The micro-controller processing unit also can determine whether a genuine filter element is being used by the internal combustion engine (i.e., whether a service technician installed a genuine filter element or an inappropriate knock-off filter element) through genuine filter recognition techniques using digital encryption and/or analog methods. Further, the micro-controller processing unit includes a variety of output capabilities (e.g., smart-phone applications, service technician tools, original equipment manufacturer telematics, dashboard indicator lights, dashboard displayed fault codes, etc.). The micro-controller processing unit utilizes algorithms and programs for retrieving, managing, interpreting and predicting filter information.

A unique integrated system is disclosed with various electronic interfaces including analog and digital input/output connections between filtration devices/sensors and the controller unit, computer area network ("CAN") connection between the ECM and the controller unit, wireless (e.g., Bluetooth®, WiFi®, ZigBee®, etc.) connection between the micro-controller and a smart-phone application software, liquid crystal display ("LCD") monitors, universal serial bus ("USB") ports, and/or cellular data network connection interface between the smart-phone device and a back-end server.

A first embodiment relates to a filter monitoring system for an internal combustion engine. The filter monitoring system includes a filter control module ("FCM") having a first input that receives at least one filtration parameter from an engine filtration device system for filtering a fluid in the internal combustion engine. The filter monitoring system further includes a second input that receives at least one engine parameter from an ECM, the ECM controlling operations of the internal combustion engine. The FCM outputs a command signal via a first output based upon the filtration parameter and engine parameter.

Another embodiment relates to a filter monitoring system ("FMS") for monitoring a plurality of separate filtration systems of an internal combustion engine. The system includes a first sensor associated with a first filtration system of the internal combustion engine, and a second sensor associated with a second filtration system of the internal combustion engine. The system further includes a FMS module. The FMS module includes a memory, at least one communication interface, an output coupled to a user output, and a processor. The communication interface provides data communication between the FMS module and an ECM of the internal combustion engine, the first sensor, and the second sensor. The processor is configured to receive input signals from the first sensor and the second sensor, and to provide service indicators for the first filtration system and the second filtration system via the user output.

A further embodiment relates to a monitoring system for monitoring a plurality of separate filtration systems and at least one fluid system of an internal combustion engine. The monitoring system includes a first sensor associated with a first filtration system of the internal combustion engine, a second sensor associated with a second filtration system of the internal combustion engine, and a third sensor configured to monitor a characteristic of a fluid associated with a fluid system of the internal combustion engine. The system further includes a monitoring module. The monitoring module includes a memory, at least one communication interface, an output coupled to a user output, and a processor. The communication interface provides data communication between the FMS module and an ECM of the internal combustion engine, the first sensor, the second sensor, and the third sensor. The processor is configured to receive input signals from the first sensor, the second sensor, and the third sensor, and to provide service indicators for the first filtration system, the second filtration system, and the fluid system via the user output.

These and other features, together with the organization and manner of operation thereof, will become apparent from the following detailed description when taken in conjunction with the accompanying drawings, wherein like elements have like numerals throughout the several drawings described below.

BRIEF DESCRIPTION OF THE FIGURES

FIG. 7A-1 and FIG. 7A-2 show an electrical diagram of the FMS of FIG. 1 outputting data to a dashboard mounted display.

DETAILED DESCRIPTION

Referring generally to the figures, a filter monitoring system ("FMS") is disclosed. The FMS includes (i) several input channels, (ii) a central processing and control unit, and (iii) several output channels. The input and output channels can be analog, digital, and/or based on SAE J1939 CAN protocols. The processing and control unit comprises electronic chips, micro-processors, memory modules, wireless communication modules and other integrated electronic components. The FMS receives input from multiple sources, such as filtration systems and the internal combustion engine's ECM. Based on the multiple inputs, the FMS determines optimal service time such that multiple filtration systems can be serviced at the same time instead of in multiple single purpose services. Such synchronization of services provides added convenience for the operators and reduces the downtime of the internal combustion engine, and therefore the downtime of the vehicle or equipment powered by the internal combustion engine. Further, additional information about the overall operation of the internal combustion engine can be gleaned from the multiple system analysis that may not be available from a traditional single system monitoring system. For example, if the FMS determines that lubrication oil is deteriorating, the FMS may determine other issues with other systems that are lubricated by the oil (e.g., fuel pumps), which may decrease the functionality of the other systems (e.g., reduce fuel pump efficiency, reduced life of lubrication oil wetted components, etc.). The FMS is capable of sending output to the user through various modes, for example, through a Bluetooth of Wi-Fi network to a smart-phone, through a wired connection to an LCD display screen on the vehicle dashboard, through a wireless communication link to existing OEM telematics systems, through a USB connection to a laptop computer, etc.

Figure 1:
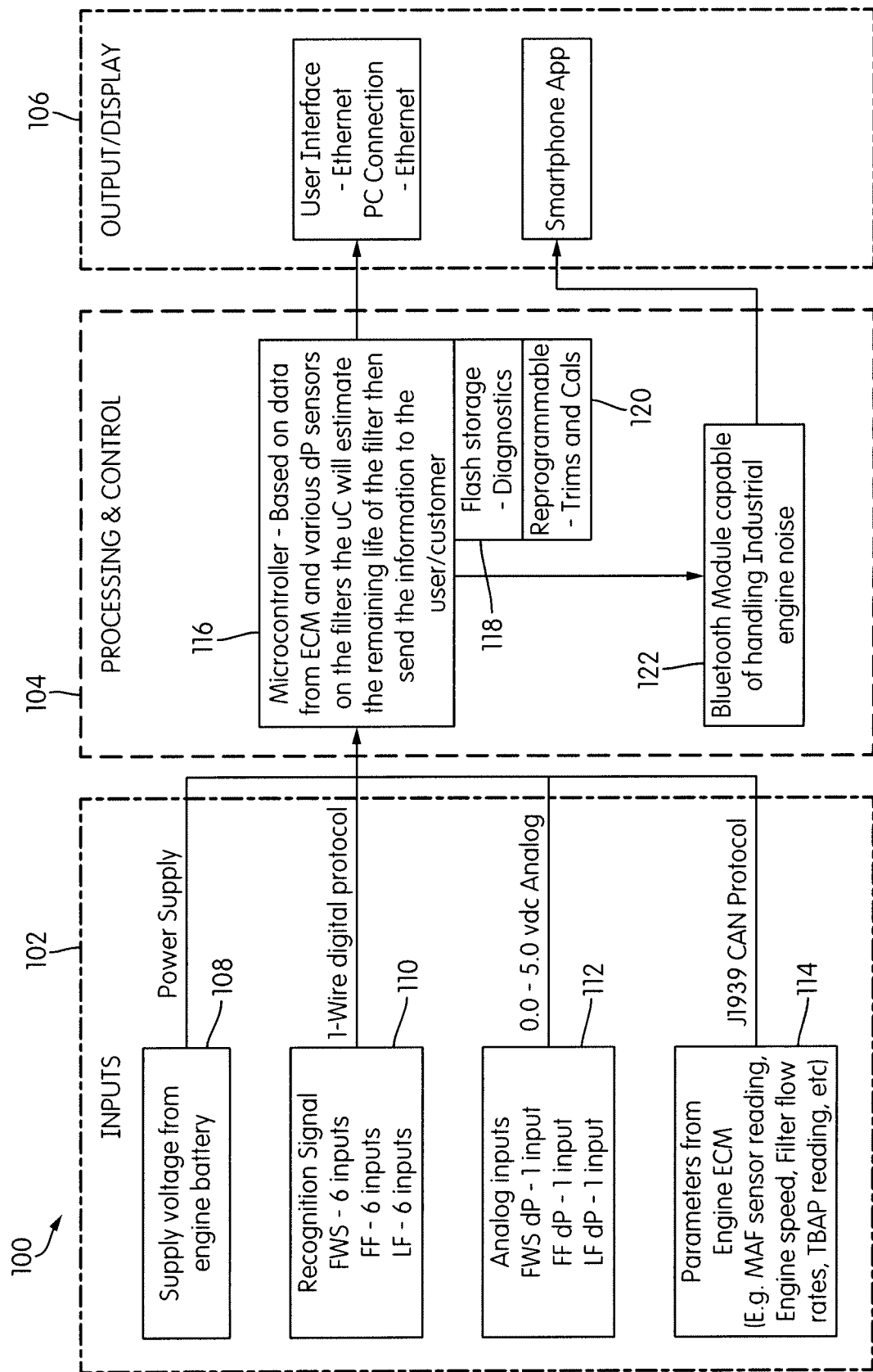
FIG. 1 shows a block diagram of a FMS according to an exemplary embodiment.

Referring to FIG. 1, a block diagram of a FMS module 100 is shown according to an exemplary embodiment. The FMS module 100 includes a plurality of inputs 102, a processing and control unit 104, and at least one output 106. The plurality of inputs 102 are provided to the processing and control unit 104. In some arrangements, the processing and control unit 104 is connected to the inputs via a communication bus. As described in further detail below, the processing and control unit 104 determines the status and optimal service times for the various filtration systems of the internal combustion system based on the inputs 102. The processing and control unit 104 communicates the filtration systems' statuses and optimal service times to the internal combustion engine operator (e.g., a driver, an equipment operator, a service technician, an equipment owner, a central dispatch facility, etc.) via the at least one output 106.

The plurality of inputs 102 includes a power supply input 108, a recognition signal input 110, analog sensor inputs 112, and an ECM input 114. The power supply input 108 provides power to the processing and control unit 104. The power supply input may be a power source independent of the internal combustion engine (e.g., a separate battery) or power provided from the internal combustion engine (e.g., via an alternator, the internal combustion engine's batter). The recognition signal input 110 provides an indication of whether the various filtration systems are using genuine filter elements. The various filtration systems may include a fuel-water separator ("FWS"), a fuel filter ("FF"), a lubricant filter ("LF"), an air filter, hydraulic fluid filters, crankcase ventilation filters or separators, coolant filters, and the like. It should also be understood that, as used herein, "separate" filtration systems may also include individual subsystems of a broader filtration system. By way of example, in a crankcase ventilation system, the portion of the system surrounding a crankcase ventilation impactor may be considered one "system," while a portion of the system crankcase ventilation coalescer (downstream of the crankcase ventilation impactor) may be another "system."

In some arrangements, the recognition signal input 110 utilizes a single digital connection (e.g., using 1-Wire® digital protocol) to the processing and control unit 104. The analog inputs 112 may be sensor inputs, such as pressure differential ("dP") sensor inputs, associated with the various filtration systems of the internal combustion engine. The dP sensor may include a first pressure sensor positioned on a first side of the filter element and a second pressure sensor positioned on a second side of the filter element such that the pressure drop across the filter element can be calculated. The ECM input 114 provides other engine parameters to the processing and control unit 104, such as MAF sensor output, engine speed, filter flow rates, temperature-barometric atmospheric pressure sensor ("TBAP") output, water-in-fuel ("WIF") sensor output, etc. The ECM input 114 may be provided via a J1939 CAN protocol.

The processing and control unit 104 includes a microcontroller 116 (referenced as "uC" in FIG. 1). The microcontroller 116 controls the various functions of the FMS module 100. The processing and control unit 104 includes a flash storage 118. The flash storage 118 stores diagnostic information (e.g., as gathered from the plurality of inputs 102). The processing and control unit 104 further includes a memory 120. The memory 120 stores programming modules that, when executed by the microcontroller 116, control the operation of the FMS module 100. The memory 120 may also include reprogrammable variables used in algorithms that calculate expected filter life. In some arrangements, the flash storage 118 and the memory 120 are embodied in a single memory device. The processing and control unit 104 also includes a communication module 122. The communication module 122 may be a wireless communication module (e.g., Bluetooth®, WiFi, ZigBee, cellular data transceiver, etc.) or a wired communication module (e.g., USB®, Ethernet, etc.). In such arrangements, the wireless communication module is designed to communicate with external devices in the presence of wireless interference or noise caused by the internal combustion engine. In some arrangements, the processing and control unit 104 is embodied as a system-on-chip controller (i.e., the microcontroller 116, the flash storage 118, the memory 120, and the communication module 122 are embodied on a single chip).

The processing and control unit 104 provides output to the output devices 106. The output devices 106 may include a dashboard display, a personal computer ("PC"), and/or wireless devices (e.g., smartphones, tablet computers, laptop computers, personal digital assistants, etc.). The processing and control unit 104 transmits filtration system statuses and service indications to the output devices 106. The output devices 106 receive the statuses and service indications via a wired connection to the microcontroller 116 (e.g., Ethernet) or via the communication module 122.

Figure 2A:
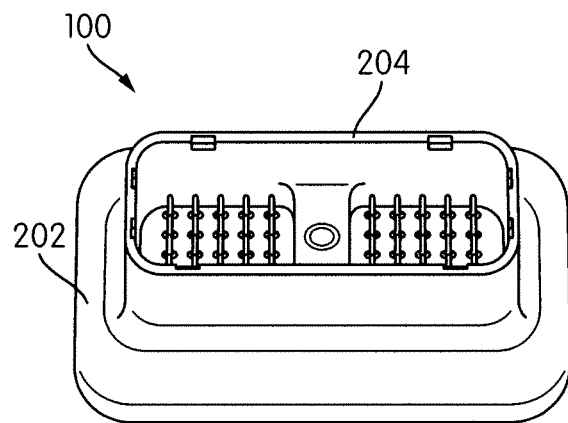
FIG. 2A shows a perspective view of the FMS of FIG. 1.

Referring to FIG. 2A, a perspective view of a FMS module 100 embodying FMS module 100 is shown according to an exemplary embodiment. The FMS module 100 is enclosed in a housing 202. A wiring harness 204 of the FMS module 100 is exposed. The wiring harness 204 connects the FMS module to the various inputs and outputs of the FMS module 100 (as described above with respect to FIG. 1). As shown in FIG. 2A, the FMS module 100 is based on the packaging method employed by the Cummins Energy Manager ("CEM") module disclosed in the incorporated U.S. patent application Ser. No. 13/412,280, filed Mar. 5, 2012, published Oct. 4, 2012 as U.S. Patent Publication No. US 2012/0253595A1. Although the housing 202 the FMS module 100 has a similar appearance to a CEM module, the layout of the components (e.g., as described above with respect to processing and control unit 104 of FIG. 1) and the wiring harness 202 (e.g., pin configurations), and the software modules are customized for functioning as a FMS module.

Possible functions performed by FMS module 100 include, but are not limited to: electronic genuine filter detection, WIF indication (e.g., based on feedback from a WIF sensor), automatic water drain control (e.g., via an automatic drain in the fuel filtration system), filter service indication (e.g., via a determination of a total amount of fluid filtered by a particular filtration system, a detected pressure drop across a filter element, the output of a service-life algorithm, etc.), fixed interval based filter service indication, oil quality monitoring and oil drain interval indication, control and release of chemical additives, fuel quality sensing and indication, leak or bypass condition detection and indication, data connection to the ECM via J-1939, and data output communication with the various output devices 106 (e.g., LCD monitors, smart phone applications, OEM telematics system, technician computers, etc.).

Figure 2B:
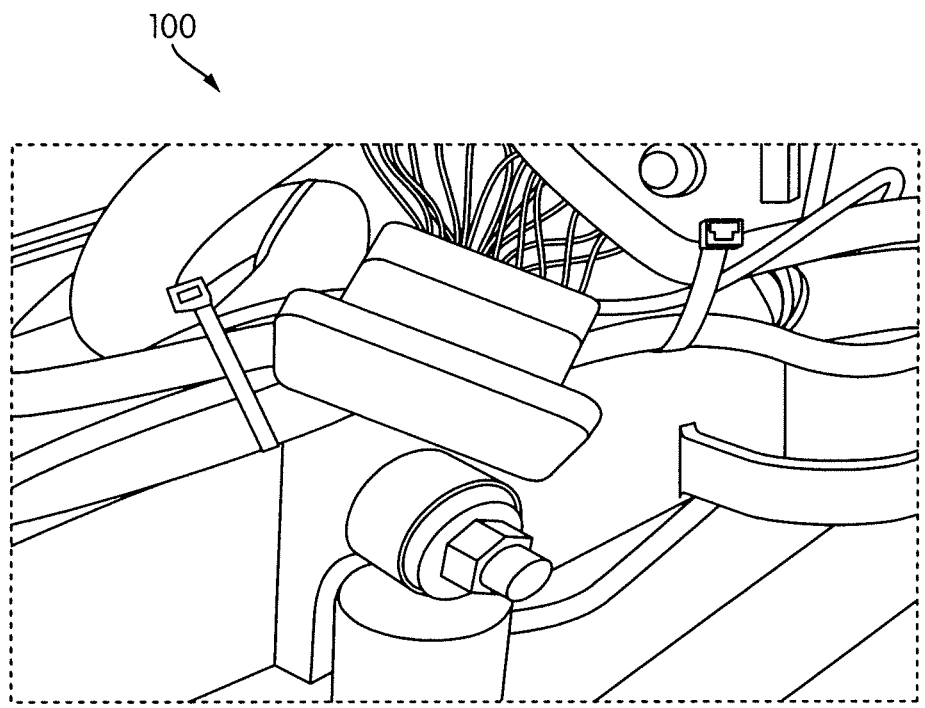
FIGS. 2B and 2C show views of the FMS of FIG. 1 connected to a wiring harness of an internal combustion engine.
Figure 2C:
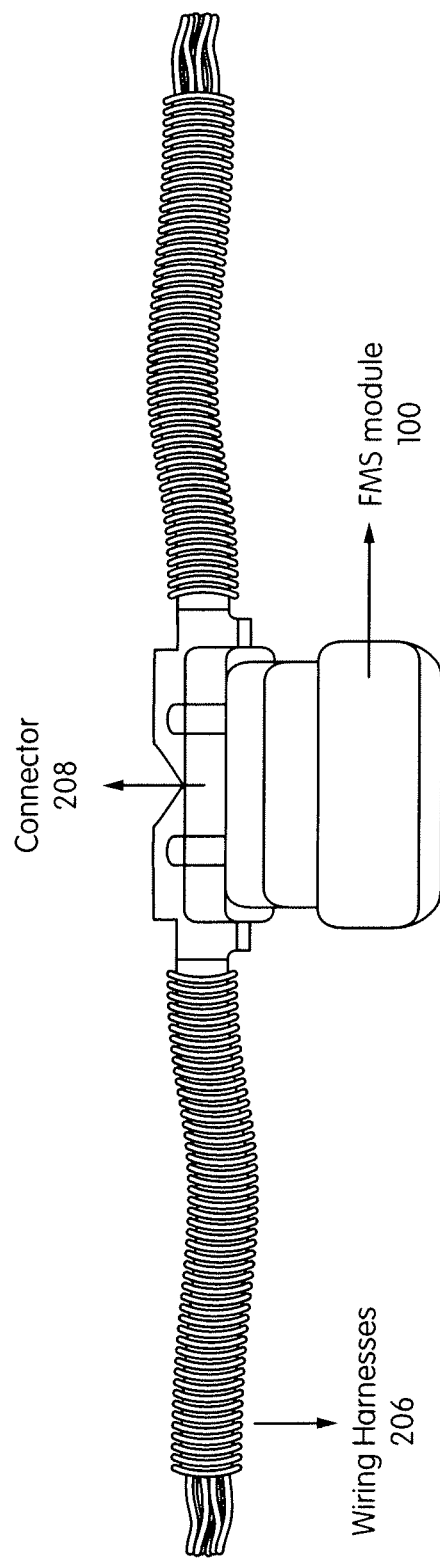

As shown in FIGS. 2B and 2C, the FMS module 100 connects to the wiring of an internal combustion engine. The FMS module 100 connects to a wiring harness 206 of the internal combustion engine. The wiring harness 206 includes a connector 208 that receives the FMS module 100. The housing 202 of the FMS module 100 may form a snap-fit connection with the connector 208. Through the wiring harness 206, the FMS module 100 the various inputs 102 and may communicate with at least a portion of the outputs 106. In some arrangements, the FMS module 100 receives operating power via the wiring harness 206 (e.g., from the ECM, directly from internal combustion engine battery, etc.). In other arrangements, the FMS module 100 includes a built-in power source independent of the internal combustion engine.

Figure 3:
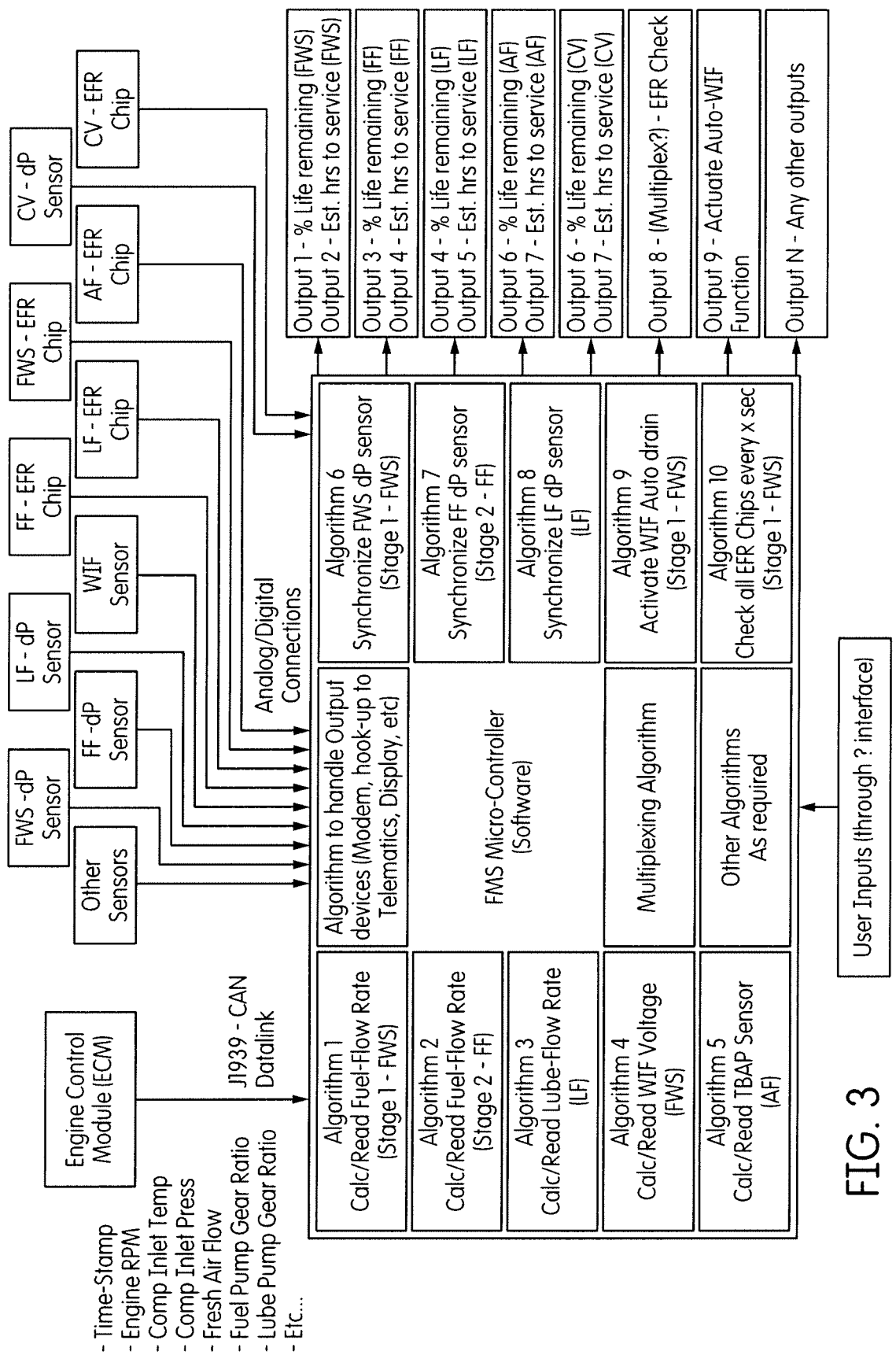
FIG. 3 shows a block diagram of various software modules and control algorithms stored in a memory of the FMS of FIG. 1.

The FMS 100 runs various algorithms to perform different filter monitoring functions. Referring to FIG. 3, a block diagram of the various software modules and control algorithms stored in flash module 118 and/or memory 120 are shown. Each software module and algorithm block that the FMS module 100 can run are shown.

In some arrangements, the FMS 100 also is part of a broader fluid monitoring system. In such arrangements, the FMS 100 also receives sensor feedback from fluid sensors associated with various fluids used by the internal combustion system. The fluid sensors may be independent of the filtration systems of the internal combustion engine. For example, the fluid sensors may measure characteristics of the fuel supplied by the fuel system, the lubricant circulated by the lubrication system, the hydraulic fluid used by the hydraulic system, etc. The fluid sensors may be positioned near or within fluid pumps (e.g., a fuel pump, a lubricant pump, a hydraulic fluid pump, etc.) in plumbing that supplies the fluids to the various components of the internal combustion engine, in the engine block, and other locations within and around the internal combustion engine that receive fluid filtered by the various filtration systems of the internal combustion engine. The fluid sensors may include temperature sensors, pressure sensors, viscosity sensors, chemical sensors (e.g., to detect chemical additives within the fluid, to detect contaminants within the fluid, etc.), and the like.

The information from the fluid sensors can be used by the FMS 100 to determine service intervals for the fluids. For example, the fluid sensors of a lubricant system may provide a better indication of thermal breakdown of the lubricant than can be gleaned from the sensors located at the lubricant filtration system. Additionally, the information received from the fluid sensors can be used in the various filter system service calculations performed by the FMS 100. For example, an information relating to a type of fuel flowing through a fuel filtration system may affect the expected life span of the fuel filter element. Information received from the fluid sensors, along with calculated information about the various fluid systems (e.g., fluid replacement warnings, expected remaining life of the engine fluids, etc.) can be output to the user or technician in a similar manner as described below with respect to the filter system information provided to the users and technicians. The information from the fluid sensors, in conjunction with the information from the filtration system sensors, can, for example be used to determine the optimal time to service the engine filters and fluid(s), as well as provide this information to users and/or technicians.

In further arrangements, the FMS 100 can also receive sensor information from other systems of the internal combustion engine or the equipment powered by the internal combustion system. For example, if the internal combustion engine powers a vehicle, the FMS 100 may receive sensor input from a tire pressure measurement system, exhaust sensors, ambient temperatures, vehicle speed sensor, and the like. This additional information may be used to assist with other calculations performed by the FMS 100 (e.g., filter life calculations, fluid life calculations, etc.).

Certain functions of the electronic FMS 100 are described in further detail below.

Electronic Genuine Filter Recognition

Various engine filter systems can be connected to the FMS module 100 via wired or wireless connections. The FMS module 100 can recognize if a genuine filter element is installed in any particular filtration system of the filtration systems of the internal combustion engine. The use of genuine filter elements (e.g., as replaced during a filtration system service operation) helps to protect the filtration system's integrity, and thus the internal combustion engine's integrity. Accordingly, the use of genuine filter elements provides the best and most reliable performance of the internal combustion engine. The FMS performs genuine filter recognition in various manners for different filter systems. For example, fuel-water separator products that have analog WIF sensors can be recognized as genuine through analog filter recognition features (e.g., as described in the incorporated U.S. patent application Ser. No. 13/864,694, filed Apr. 17, 2013), or fuel-water separators that have digital WIF sensors (e.g., as described in the incorporated U.S. Provisional Patent Application Ser. No. 61/810,946, filed Apr. 11, 2013) can be connected to the FMS module 100 to recognize if a genuine fuel-water separator is installed. In another example, the FMS module 100 could be connected to a fuel-filter separator with a digital recognition feature installed on a bracket. In a third example, a fuel/lube module with a digital recognition feature capable of recognizing a genuine filter cartridge element may be connected to the FMS module 100.

Figure 2D:
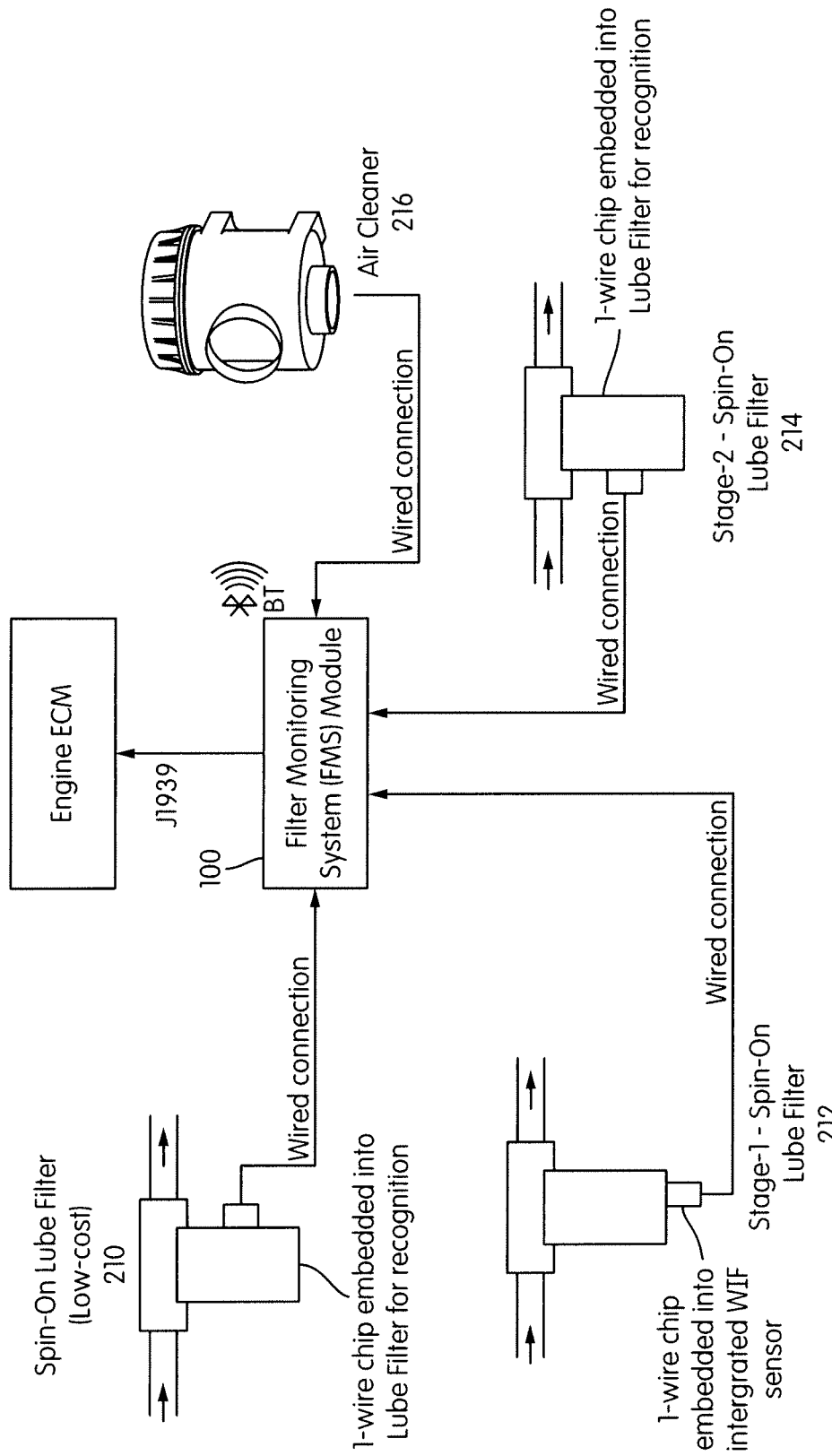
FIGS. 2D and 2E show block diagrams of the FMS of FIG. 1 arranged to perform genuine filter recognition according to exemplary embodiments.

Various filter element recognition techniques may be used by the FMS 100 in determining whether an installed filter element is genuine. Referring to FIG. 2D, a block diagram of the FMS 100 arranged to perform genuine filter recognition is shown according to an exemplary embodiment. The FMS 100 is connected to a lubricant filtration system 210, a first stage fuel filtration system 212, a second stage fuel filtration system 214, and an air filtration system 216. Each of the filter elements for the lubricant filtration system 210, the first and second stage fuel filtration systems 212 and 214, and the air filtration system 218 includes a 1-Wire chip embedded into the filter element. The 1-Wire chip includes filter element identifying information that is sent via a wired connection to the FMS 100. The FMS 100 can determine whether the installed filter elements are genuine or not genuine based on the identifying information (or lack thereof) that is sent from the 1-Wire chips to the FMS 100. In other arrangements, a different type of identifying circuit (e.g., a resistor based circuit, a non-1-Wire based circuit, etc.) is embedded into each filter element that provides identifying information to the FMS 100.

Figure 2E:
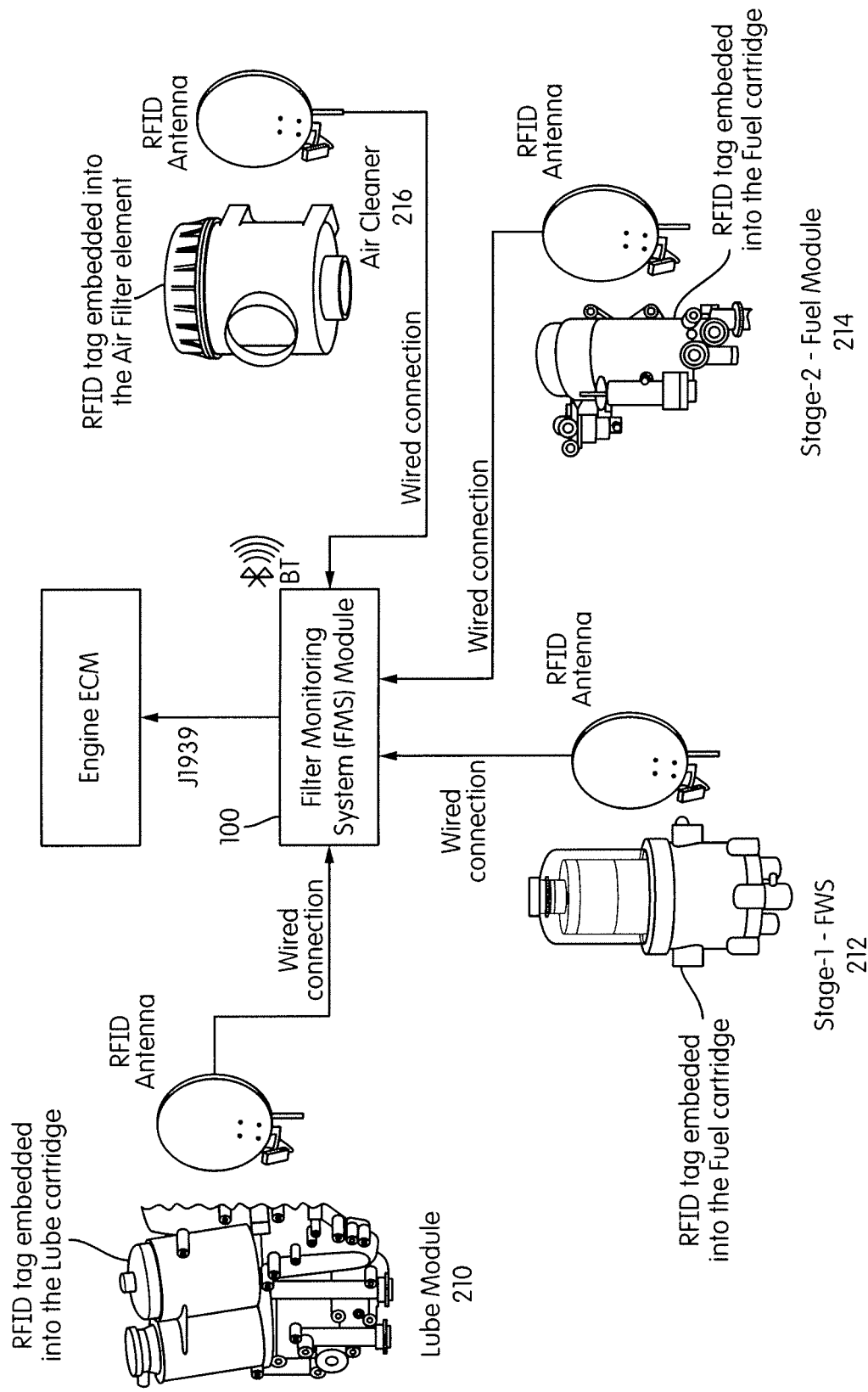

Referring to FIG. 2E, a block diagram of the FMS 100 arranged to perform genuine filter recognition is shown according to another exemplary embodiment. The arrangement of FIG. 2E is similar to that of FIG. 2D. However, in FIG. 2E, each filter element of the various filtration systems are fitted with a radio frequency identification ("RFID") chip. The RFID chips include identifying information, such as a filter element serial number or code. The RFID chips may be passive RFID chips (e.g., wirelessly powered by an RFID reader) or active RFID chips (e.g., having an independent power source). In the embodiment depicted in FIG. 2E, each filter housing that receives the filter elements includes an RFID reader that provides RFID chip information to the FMS 100 via a wired or wireless connection. (In alternative implementations, the RFID reader may be positioned within or on the filter head, the filter module, or another nearby location.) Accordingly, when a filter element having an RFID chip in a designated position (e.g., in a position such that the RFID chip is positioned near the RFID reader when the filter element is installed), the identifying information is read by the RFID reader and transmitted to the FMS 100. Based on the identifying information, the FMS 100 can determine whether the installed filter element is genuine or not genuine. In other arrangements, other wireless identifier transmission systems are used (e.g., near field communication, Bluetooth, Bluetooth Low Energy, WiFi, etc.), The FMS module 100 can have built-in programming and calibration to recognize the genuine filters and to identify non-approved filter elements installed in any of the filtration systems. The built-in programming and calibration may be in the form of stored rules for recognizing serial numbers, part numbers, or any other encryption method (e.g., stored in flash module 118 or memory 120). In an alternative arrangement, the built-in programming and calibration may be in the form of stored rules for recognizing the presence and form of electrical output from sensor associated with genuine filter elements, or the absence thereof.

In some arrangements, the FMS 100 has the capability to turn-on or turn-off certain features and indications based on the status of genuine filter detection. For example, the FMS module 100 may send genuine or non-genuine filter information to the ECM such that the ECM can take corresponding actions (e.g., —derating the engine, placing the engine in a limp mode, etc.), or such that the ECM can alert the user/operator with a warning (e.g., a dashboard indicator). When an internal combustion engine is placed into limp mode, the engine is operating in a mode with marginal functionality (e.g., enough engine output to allow the vehicle or equipment to be moved to a service facility, but not much functionality beyond that). The FMS module 100 may also limit other features of the FMS module 100 upon detection of an installed non-authorized replacement filter element. For example, the FMS module 100 may decide to not indicate service life based on a dP sensor feedback signal if a genuine filter is not detected (i.e., such that the user cannot take full advantage of the features of the FMS module 100). In another example, the FMS module 100 may convey information about an installed non-genuine filter to the ECM, in which case, the ECM may limit the engine power, de-rate the engine, and the like in order to protect the engine from catastrophic failures.

WIF Indication and/or Automatic Water Drain

In some internal combustion engines, the WIF sensor of a fuel-water separator is connected to the engine ECM. The FMS module 100 receives input from the ECM (e.g., via the ECM input 114) and is capable of taking the input from the analog or digital WIF sensor via the ECM. Based on the input from the WIF sensor, the FMS module 100 can provide water drain indication directly to the user or operator of the internal combustion engine. The water drain indication is triggered when the WIF sensor detects a threshold amount of water in the fuel-water separator housing. In some arrangements, the FMS module 100 is capable of warning the user or operator of an imminent fuel-system failure if the FMS module 100 detects that water has not been drained for a long period of time, thus saving the user or operator from expensive engine system break-downs.

In arrangements where an automatic water detection and/or water drain device (e.g., see the incorporated U.S. Pat. No. 6,207,045 or the incorporated U.S. patent application Ser. No. 12/860,499, filed Aug. 20, 2010, now U.S. Pat. No. 8,409,446, issued Apr. 2, 2013) is installed and connected to the FMS module 100, the FMS module 100 can trigger the initiation of a water drain event by sending activation signals to a controller component (e.g., such as a solenoid valve of the automatic water drain) installed on the auto-drain device.

Service Indication Via Input from dP Sensors

FMS module 100 is capable of connecting to dP sensors installed on existing filtration systems. The FMS module 100 collects restriction information from the dP sensors and uses the restriction information to gauge the plugging condition of the filter system. Additionally, the FMS module 100 is also connected to the ECM through the J1939 datalink and draws important engine parameters from the ECM, which the FMS module 100 uses to calculate the fluid flow-rate through the filter system. This calculation is done individually for each of the filter systems (example lube filter, fuel filter, fuel-water separator, air filter, etc.). Based on the outcome of the calculation, the FMS module 100 can send an indication to a user or operator via the outputs 106 of the internal combustion engine indicating a filter life (e.g., a percentage of filter life remaining, a number of miles of filter life remaining, etc.) and a replace filter indication.

Service Indication Based on Fixed Service Interval

In cases where the dP sensors are not available to the FMS module 100 (e.g., the dP sensors are not connected or are faulty), the FMS module 100 is capable of switching to a fixed service interval mode to protect the integrity of the engine. Accordingly, the FMS module 100 will still provide indication for service life when threshold miles/hours of filter are used.

Oil Quality Indication and Service Predictions

The FMS module 100 is capable of connecting to an oil quality sensor installed in the lubrication system of the engine. An exemplary sensor is described in U.S. Provisional Patent Application No. 61/838,962, filed Jun. 25, 2013, the entire disclosure of which is incorporated herein by reference. With inputs from the oil quality sensor (e.g., as described above with respect to the fluid sensors), and with other engine parameters received from ECM via the J1939 datalink, the FMS module 100 can calculate a condition of oil (e.g., an amount of life left in the oil). The FMS module 100 can indicate usable service life of the oil to the user or operator of the engine via the outputs 106. The FMS module 100 may also provide indication for oil drain interval.

Control of Chemical Additives and Release of Additives

Some internal combustion engines include a chemically active lube filter ("CALF") (e.g., as described in the incorporated U.S. patent application Ser. No. 13/827,992, filed Mar. 14, 2013 and U.S. Provisional Patent Application Ser. Nos. 61/658,603, filed Jun. 12, 2012 and 61/595,326, filed Feb. 6, 2012). In arrangements where a CALF is present on the engine, the FMS module 100 can calculate a quality of oil, and electronically control the release of a particular amount of chemical additives to the oil from a chemical reservoir to improve the condition of the lubricating oil. The electronic control and release of additives in the oil system, based on feedback from the oil quality sensing function of the FMS module 100, is an efficient method of controlling and extending oil quality as compared to chemical release based on a calculated pressure differential.

Fuel Quality Sensing and Indication

Various other sensors for fuel quality sensing (e.g., a sulfur sensor, a water content sensor, etc.) can be connected to the FMS module 100. The fuel quality sensors allow the FMS module 100 to determine fuel quality and to provide an indication of the fuel quality to the user or operator via the outputs 106. The signals from the fuel quality sensors can also be provided to the ECM through the J1939 datalink from the FMS module 100 such that the ECM can make decisions for de-rating, shutting down or operating in a safe-mode when poor quality fuel is sensed, thereby protecting from catastrophic engine and fuel-system failures. Alternatively or additionally, the fuel quality sensor may be a fuel type sensor (e.g., a sensor that determines whether the internal combustion engine is using ultra-low sulfur diesel fuel or biodiesel).

Data Output Functions

Figure 4A:
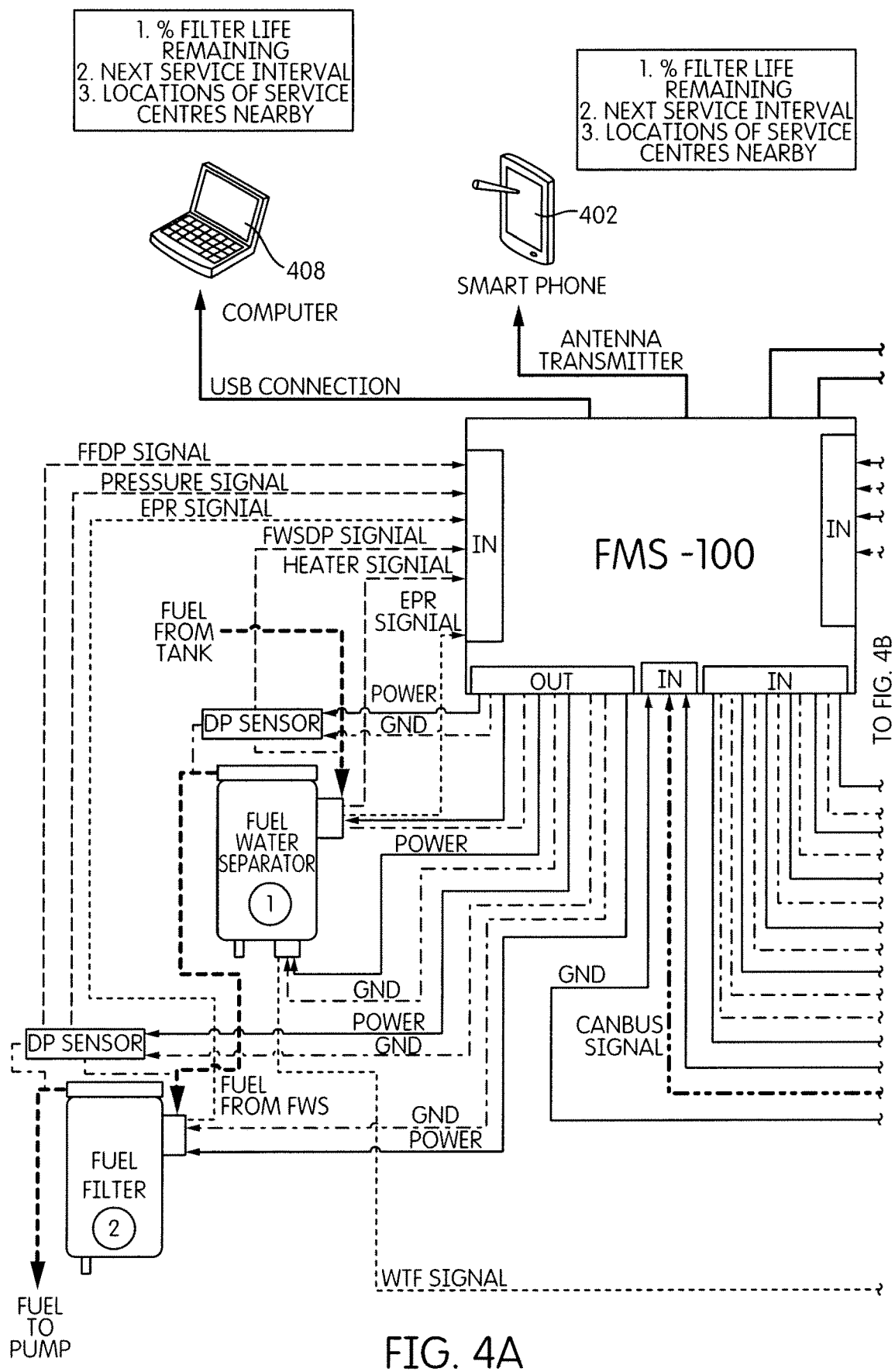
FIG. 4A and FIG. 4B show a block diagram of the FMS of FIG. 1 transmitting information to external devices.
Figure 4B:
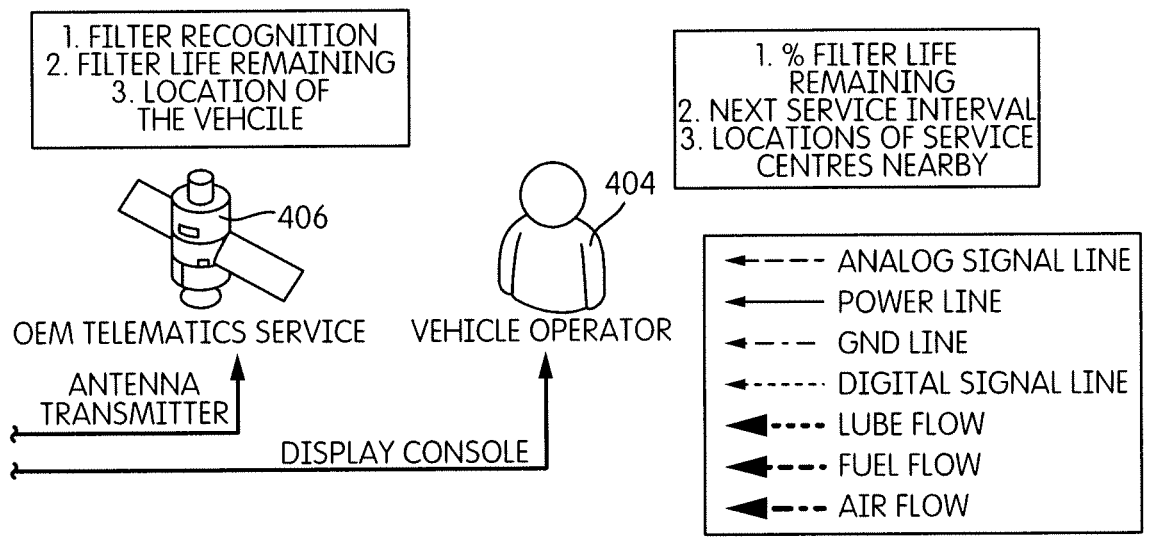
Figure 4B:
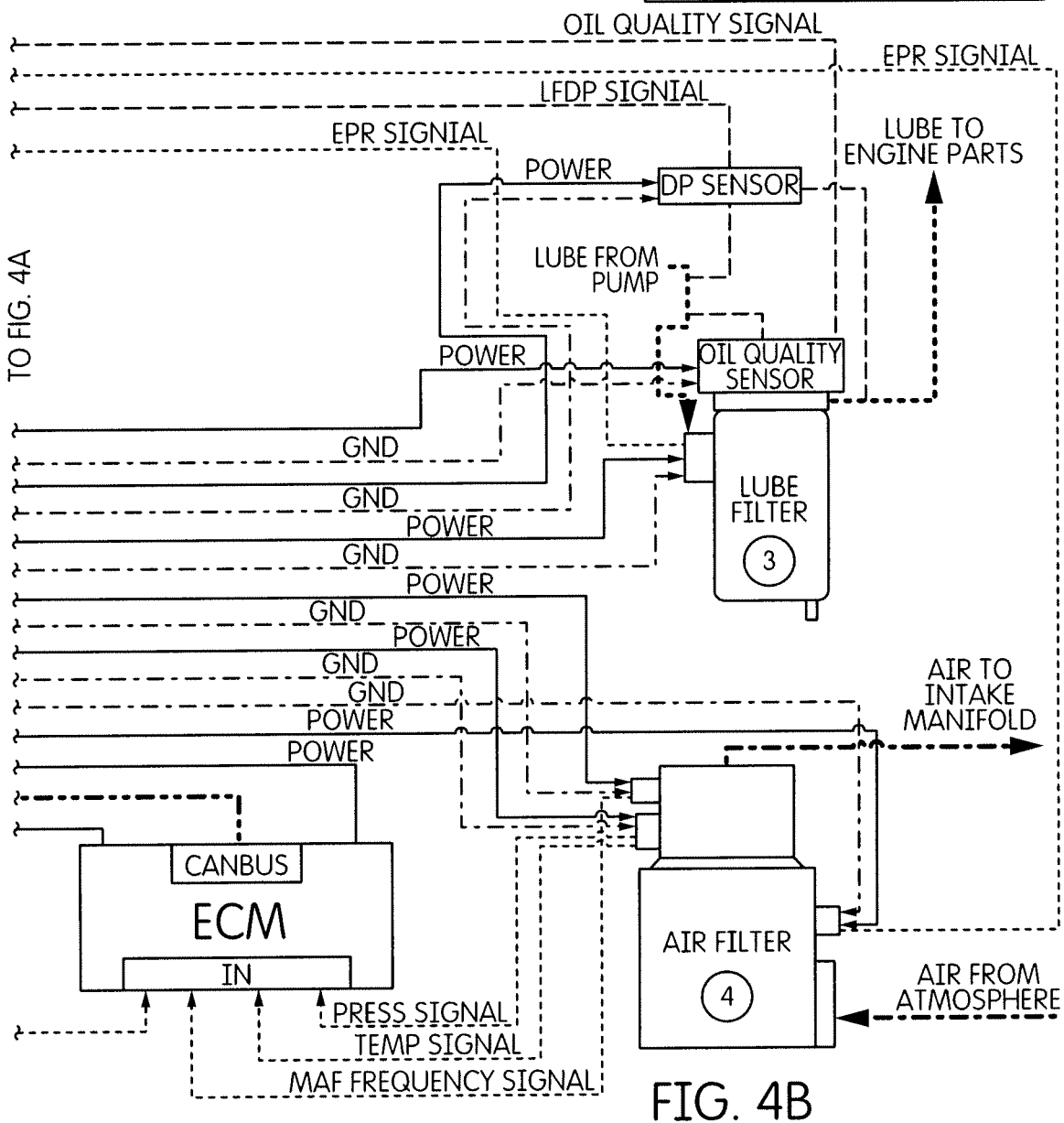

The FMS module 100 has the capability to transmit processed data to external devices by various means. Referring to FIGS. 4A and 4B, a block diagram of the FMS module 100 transmitting information to external devices via four exemplary methods is shown according to an exemplary embodiment. The four different methods of data output include output to a smartphone application 402 (e.g., via Bluetooth or Wi-Fi; as described in additional detail below with respect to FIG. 6), output to a directly to an engine operator via a dashboard mounted display 404 (e.g., as described in further detail below with respect to FIGS. 7A-1, 7A-2 and 7B), to an OEM telematics communication link 406, and output to a service technician tool 408 (e.g., a computer). The FMS module 100 may transmit processed data directly to these devices or may do so via an intermediary device, such as the ECM. For example, the FMS module 100 may transmit data to the ECM, which transmits a fault code to the dashboard mounted display 404 or other device.

Figure 5:
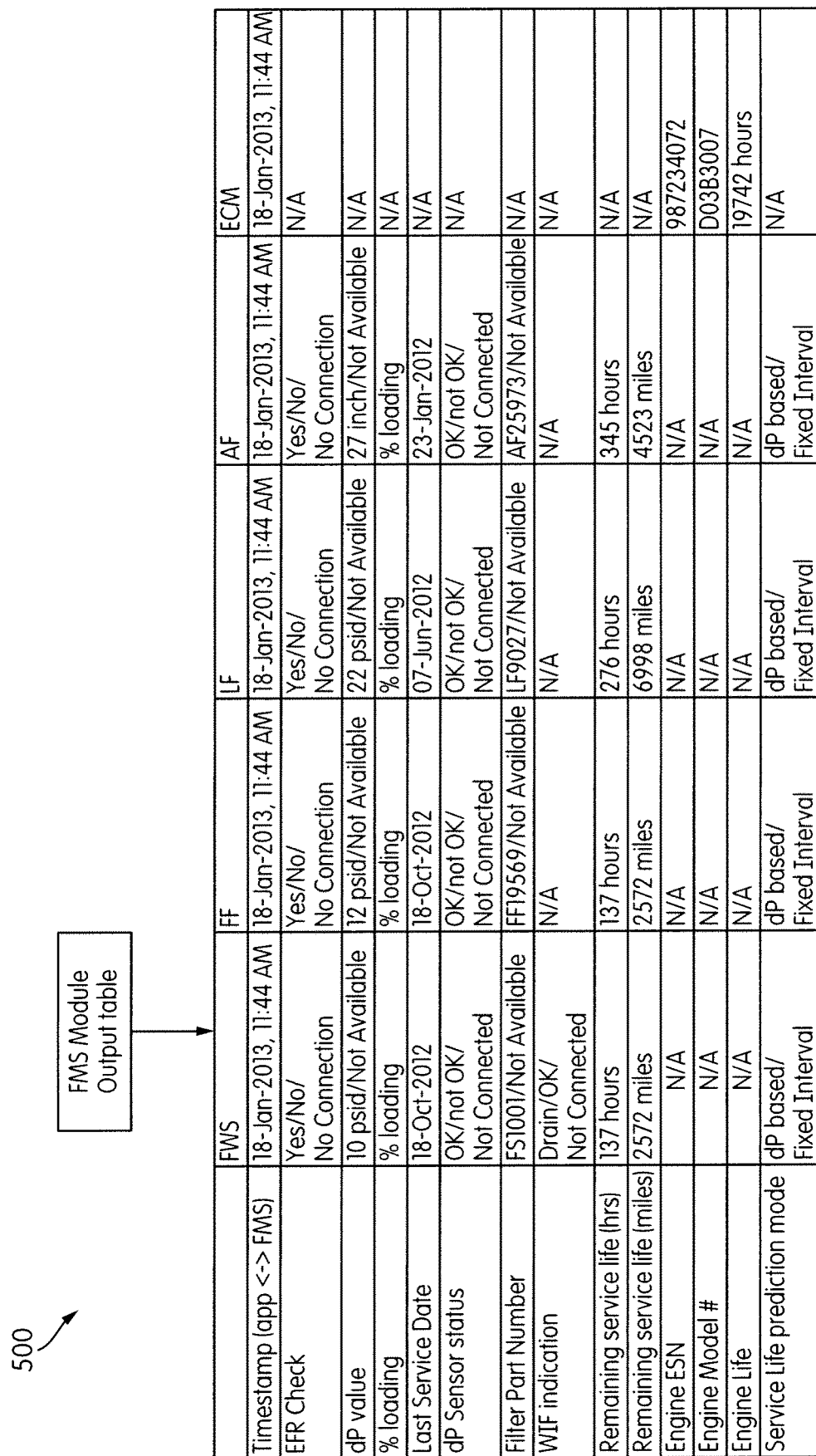
FIG. 5 shows an information output table according to an exemplary embodiment.

The FMS module 100 may output processed information to any individual or combination of these output devices by various methods. One example method is via the use of 'Output Tables'. The FMS module 100 may process all information and build a table of parameters with their respective values for each monitored filter system, which can then be transmitted in part or in entirety to the output device reading from the FMS module 100. Referring to FIG. 5, an exemplary FMS output table 400 is shown according to an exemplary embodiment. The receiving device (e.g., a service technician's computer, an operator's smartphone, etc.) may need to first need to establish a secure connection with the FMS module 100 via a pre-determined authorization code method of hand-shaking, before the output table can be transmitted to the device (e.g., pair the receiving device with the FMS module 100 via the Bluetooth pairing process). Although shown as being able to connect to four different types of devices, the FMS module 100 is capable of connecting to other types of output devices that can establish a communication session with the FMS module 100.

Figure 6:
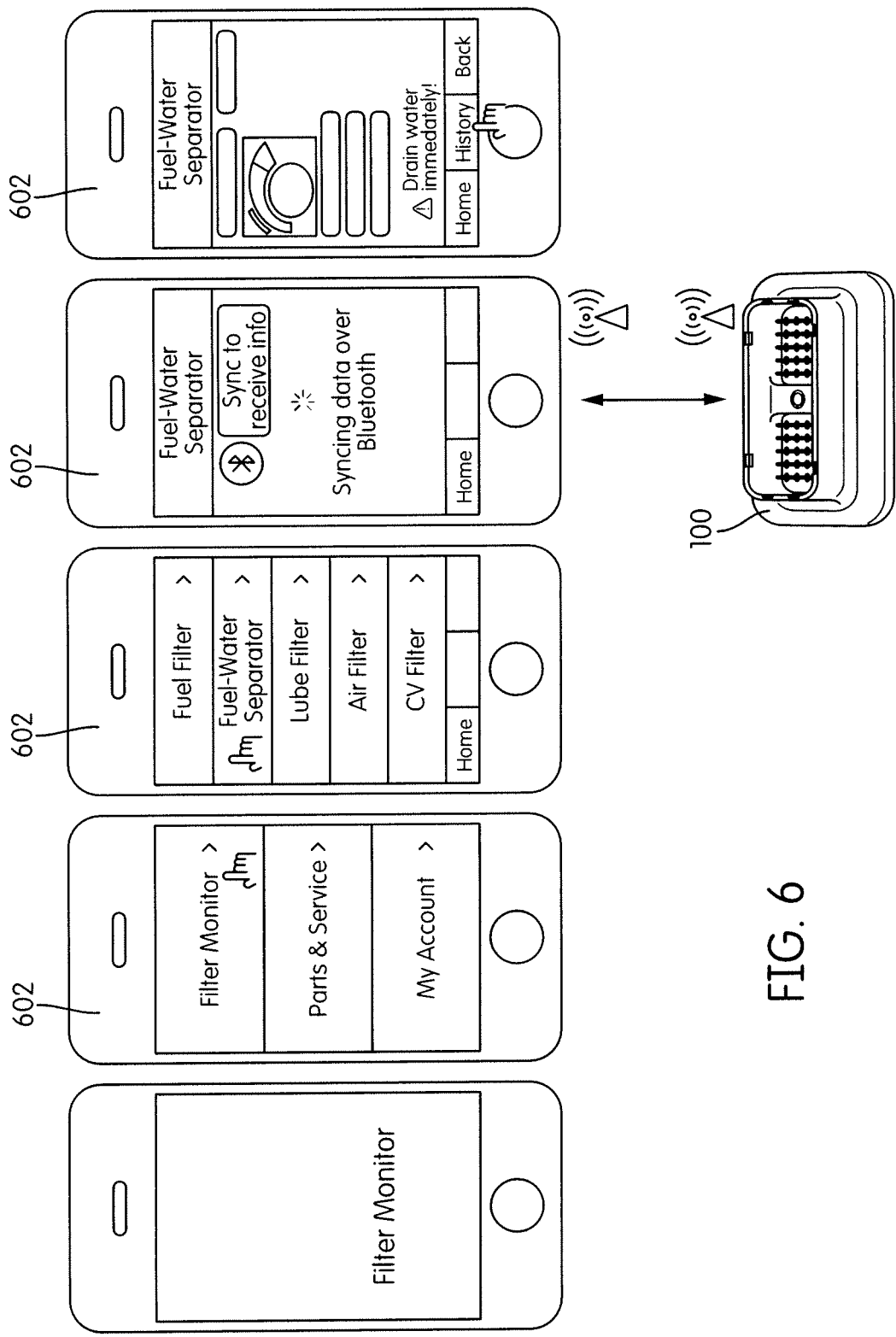
FIG. 6 shows a schematic diagram of the FMS of FIG. 1 communicating with a smartphone.

Referring to FIG. 6, the FMS module 100 can communicate wirelessly with output devices, such as a user's smartphone 602. The smartphone 602 is running a smartphone application 402 that enables the communication between the smartphone 602 and the FMS module 100. Through the smartphone application 402, the FMS module 100 can communicate information relating to the various statuses of the monitored filtration systems of the internal combustion engine. The information may include information relating to a current status (e.g., operational, errors), upcoming service information (e.g., time to next service, miles to next service, etc.), filter element identification information, and other information on a filtration system-by-system basis. The user of the smartphone 602 can interact with the smartphone application 402 (e.g., through interaction with a graphical user interface of the smartphone application 402) to retrieve real-time or near real-time data from the FMS module 100. As discussed above, retrieving the information from the FMS module 100 may require that the smartphone 602 go through a pairing process with the FMS module 100.

Figures 1, 7A:
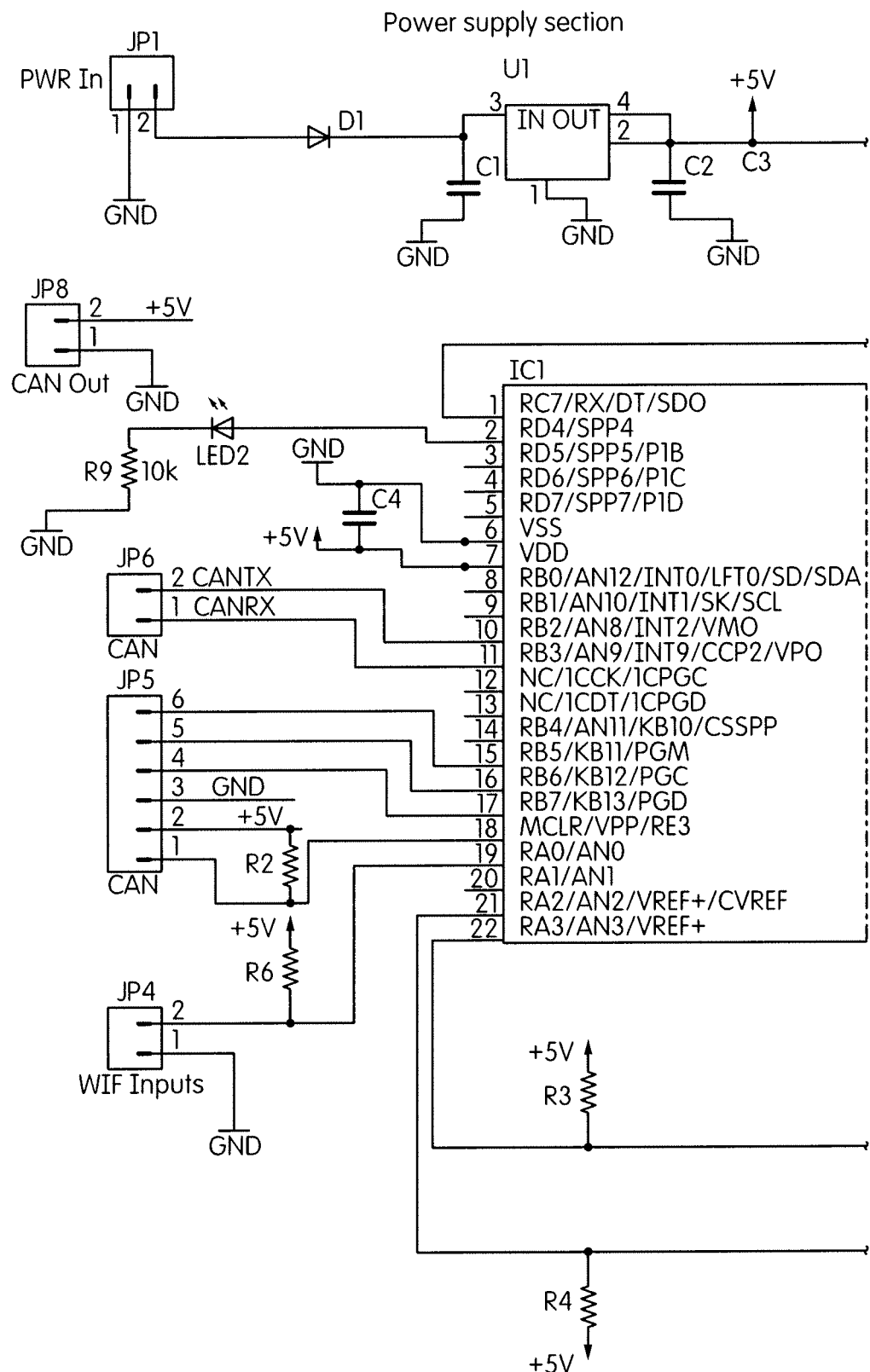
Figures 2, 7A:
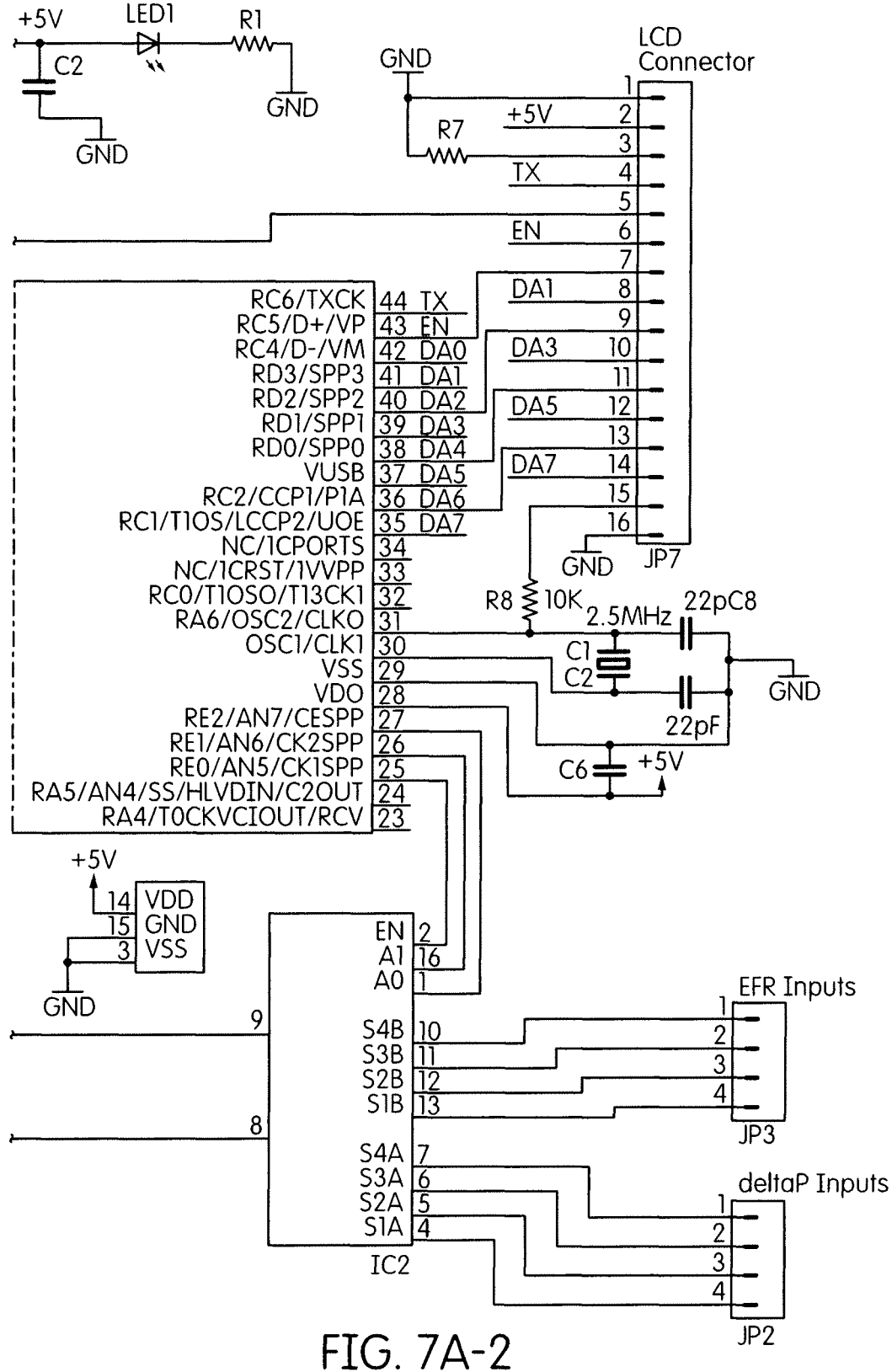
Figure 7B:
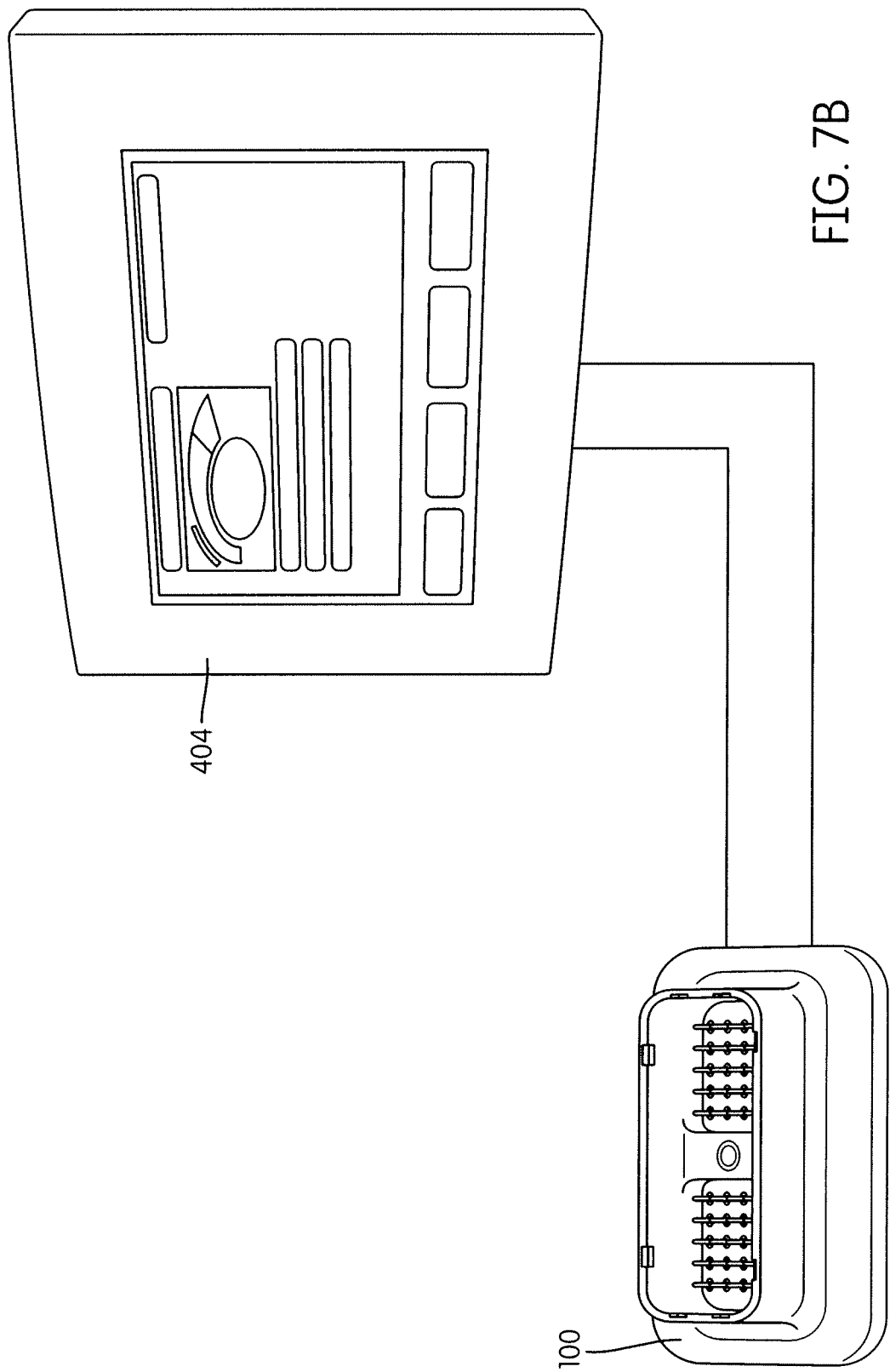
FIG. 7B shows a schematic diagram of the FMS of FIG. 1 outputting data to a dashboard mounted display.

Referring to FIGS. 7A-1 AND 7A-2, an electrical diagram of the FMS module 100 outputting data to a dashboard mounted display 404 is shown according to an exemplary embodiment. FIG. 7B shows the dashboard mounted display 404 connected to the FMS module 100. Through the dashboard mounted display, a user or operator of the internal combustion engine (e.g., a driver of a vehicle powered by the internal combustion engine) can review information relating to the various statuses of the monitored filtration systems of the internal combustion engine. The information may include information relating to a current status (e.g., operational, errors), upcoming service information (e.g., time to next service, miles to next service, etc.), filter element identification information, and other information on a filtration system-by-system basis. The user or operator can interact with a graphical user interface of the dashboard mounted display 404 in a similar manner as described above with respect to the smartphone application 402.

In the present disclosure, certain terms have been used for brevity, clearness and understanding. No unnecessary limitations are to be implied therefrom beyond the requirement of the prior art because such terms are used for descriptive purposes only and are intended to be broadly construed. The different systems and methods described herein may be used alone or in combination with other systems and devices. Various equivalents, alternatives and modifications are possible within the scope of the appended claims. Each limitation in the appended claims is intended to invoke interpretation under 35 U.S.C. § 112, sixth paragraph only if the terms "means for" or "step for" are explicitly recited in the respective limitation.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

Any references herein to the positions of elements are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A filter monitoring system, comprising:
 a controller configured to:
  receive a filtration parameter from a filtration system associated with an equipment;
  receive an equipment parameter from an equipment control module that controls operations of an equipment;
  in response to the filtration parameter being available, calculate a service life of a component of the filtration system based on the filtration parameter and the equipment parameter;
  in response to the filtration parameter being unavailable, apply a fixed service interval; and
  output a command signal based on the filtration parameter and the equipment parameter.

2. The filter monitoring system of claim 1, wherein the equipment parameter comprises at least one of a mass air flow, an engine speed of an engine, a filter flow rate, a temperature-barometric atmospheric pressure sensor output, or a water-in-fuel sensor output.

3. The filter monitoring system of claim 1, wherein the filtration system comprises at least one of a fuel-water separator system, a fuel filtration system, a lubricant filtration system, an air filtration system, a hydraulic filtration system, a crankcase ventilation filtration system, a crankcase ventilation separator system, or a coolant filtration system.

4. The filter monitoring system of claim 3, wherein:
the filtration system includes a hydraulic filtration system, and
the filtration parameter comprises an input received from a temperature sensor, a pressure sensor, a viscosity sensor, and/or a chemical sensor associated with the hydraulic filtration system.

5. The filter monitoring system of claim 1, wherein:
the filtration system is configured to receive a genuine filter element that comprises an identification circuit, and
the controller is configured to:
in the absence of receiving identification information due to a non-genuine filter element that does not include an identification circuit being installed in the filtration system, determine that the filter element is non-genuine, and
generate a signal indicative of the filter element being non-genuine.

6. The filter monitoring system of claim 5, wherein the controller is further configured to:
in response to a filter element that includes an identification being installed in the filtration system, receive identification information from the identification circuit,
based on the identification information, determine whether the filter element is the genuine filter element or a non-genuine filter element, and
generate the identification signal indicative of the filter element being genuine or non-genuine.

7. The filter monitoring system of claim 6, wherein the controller is configured to receive the identification information from the identification circuit via a wireless link.

8. The filter monitoring system of claim 6, wherein:
the filtration system comprises a housing configured to receive the filter element, the housing comprising a reader configured to receive the identification information from the filter element, and
the controller is configured to receive the identification information from the reader.

9. The filter monitoring system of claim 6, wherein the controller is configured to communicate the identification signal to the equipment control module.

10. The filter monitoring system of claim 5, wherein the filtration parameter is a differential pressure across the filter element, and wherein the controller is further configured to:
determine a service life of the filter element based on the differential pressure;
in response to determining that the filter element is a genuine filter element, generate a service life signal indicative of the service life; and
in response to determining that the filter element is non-genuine filter element, withhold generation of the service life signal.

11. The filter monitoring system of claim 1, wherein the filtration system comprises a lube filtration system, and wherein the controller is further configured to:
determine a quality of a lubricant flowing through the lubricant filtration system based on the filtration parameter, and
cause controlled release of an amount of chemical additives to the lubricant from a chemical reservoir based on the quality of the lubricant.

12. The filter monitoring system of claim 1, wherein the filtration system is a fuel filtration system, and wherein the controller is further configured to:
determine a quality of the fuel based on a signal received from a fuel quality sensor, and
communicate a fuel quality signal indicative of the fuel quality of the equipment control module.

13. The filter monitoring system of claim 1, wherein the controller is connected to at least one of the filtration system, the equipment control module, or a user display via a wireless link.

14. The filter monitoring system of claim 1, wherein the filtration parameter is provided by a pressure or differential pressure sensor associated with the filtration system.

15. The filter monitoring system of claim 14, wherein the controller is configured to, based upon an output of the pressure or differential pressure and the equipment parameter, calculate fluid flow-rate through the filtration system.

16. The filter monitoring system of claim 1, wherein the equipment parameter comprises a temperature, an indication of an amount of hours the equipment has operated, an amount of miles a vehicle powered by the equipment has driven, a fluid flow rate, or a duty cycle.

17. A filter monitoring system ("FMS") for monitoring a plurality of separate filtration systems of an equipment, the FMS system comprising:
a first sensor associated with a first filtration system of an equipment,
a second sensor associated with a second filtration system of the equipment; and
a FMS module comprising:
a memory,
at least one communication interface providing data communication between the FMS module and an equipment control module of the equipment, the first sensor, and the second sensor,
an output coupled to a user output, and
a processor configured to:
receive input signals from the first sensor and the second sensor,
calculate a service life for a component of one separate filtration system of the plurality of separate filtration systems using one of the received input signals when at least one of the received input signals is available,
apply a fixed service interval mode when the received input signals are not available, and
provide service indicators for the first filtration system and the second filtration system via the user output.

18. The filter monitoring system of claim 17, wherein first filtration system is one of a fuel filtration system, a fuel-water separator, a lubricant filtration system, a hydraulic filtration system, a coolant filtration system, or an air filtration system.

19. The filter monitoring system of claim 18, wherein the second filtration system is a different type of filtration system than the first filtration system.

20. The filter monitoring system of claim 17, wherein the processor is configured to determine an optimal service time such that the first filtration system and the second filtration system can be serviced in the same time window.

21. The filter monitoring system of claim 17, wherein the processor is configured to send a service indication to the user output when the optimal service time is determined.

22. The filter monitoring system of claim 17, wherein the user output is one of a smartphone or a dashboard display.

23. The filter monitoring system of claim 20, wherein the first sensor is a pressure differential sensor.

24. A monitoring system for monitoring a plurality of separate filtration systems and at least one fluid system of an equipment, the monitoring system comprising:
- a first sensor associated with a first filtration system of the equipment, wherein the first sensor is a fluid sensor,
- a second sensor associated with a second filtration system of the equipment;
- a third sensor configured to monitor a characteristic of a fluid associated with a fluid system of the equipment; and
- a monitoring module comprising:
  - a memory,
  - at least one communication interface providing data communication between the monitoring module and an equipment control module of the equipment, the first sensor, the second sensor, and the third sensor,
  - an output coupled to a user output, and
  - a processor configured to:
    - receive input signals from the first sensor, the second sensor, and the third sensor,
    - calculate a service life for a component of one separate filtration system of the plurality of separate filtration systems using one of the received input signals when the one of the received signals is available,
    - apply a fixed service interval mode when the one of the received signals is not available, and
    - provide service indicators for the first filtration system, the second filtration system, and the fluid system via the user output.

25. The monitoring system of claim 24, wherein the processor is further configured to determine an optimal service time such that the first filtration system, the second filtration system and the fluid system can be serviced in a single time window.

26. The monitoring system of claim 25, wherein the processor is further configured to send a service indication to the user output when the optimal service time is determined.

* * * * *